US012742468B2

(12) United States Patent
Wu et al.

(10) Patent No.: US 12,742,468 B2
(45) Date of Patent: Sep. 22, 2026

(54) ROTARY POSITIONING DEVICE

(71) Applicant: HANWIT PRECISION INDUSTRIES LTD., New Taipei (TW)

(72) Inventors: Ming-De Wu, New Taipei (TW); Ching-Kai Chang, New Taipei (TW)

(73) Assignee: HANWIT PRECISION INDUSTRIES LTD., New Taipei (TW)

( * ) Notice: Subject to any disclaimer, the term of this patent is extended or adjusted under 35 U.S.C. 154(b) by 880 days.

(21) Appl. No.: 18/106,636

(22) Filed: Feb. 7, 2023

(65) Prior Publication Data

US 2023/0175542 A1 Jun. 8, 2023

Related U.S. Application Data

(63) Continuation-in-part of application No. 17/510,777, filed on Oct. 26, 2021, now Pat. No. 12,234,849.

(51) Int. Cl.
*F16B 21/04* (2006.01)

(52) U.S. Cl.
CPC .................................... *F16B 21/04* (2013.01)

(58) Field of Classification Search
CPC ...... F16B 21/02; F16B 21/165; F16B 5/0208; F16B 5/0266; F16B 5/0621; F16B 5/065; F16B 2005/0671; F16B 2/04; F16B 7/1409; F16B 7/1436; F16B 21/04; B23Q 3/18; Y10T 403/592
See application file for complete search history.

(56) References Cited

U.S. PATENT DOCUMENTS

| | | | | |
|---|---|---|---|---|
| 3,594,876 A * | 7/1971 | Gunther | F16B 21/04 | 411/555 |
| 3,747,966 A * | 7/1973 | Wilkes | F16D 3/387 | 403/322.2 |
| 3,822,951 A * | 7/1974 | Bornzin | A01D 69/002 | 403/322.2 |
| 3,827,816 A * | 8/1974 | Knapp | F16D 1/116 | 403/322.2 |
| 4,859,110 A * | 8/1989 | Dommel | F16D 1/116 | 403/328 |
| 5,601,380 A * | 2/1997 | Guthrie | F16D 1/116 | 403/328 |
| 8,250,710 B2 * | 8/2012 | Chang | G06F 1/1681 | 16/337 |

(Continued)

*Primary Examiner* — Matthew R Mcmahon
(74) *Attorney, Agent, or Firm* — MUNCY, GEISSLER, OLDS & LOWE, P.C.

(57) ABSTRACT

A rotary positioning device includes a base, a fixing seat assembled on the shaft and stopper of the base and having and a movable positioning body respectively placed in each horizontal through-hole thereof, a rotation unit including a driving member and a rotating member and assembled outside the fixing seat, the driving member including a rotating shaft movably installed inside the protruding shaft portion of the fixing seat and a connecting portion located on one side of the rotating shaft, the rotating member including two inner shoulders that rotate and resist or retreat from the clamping portion of the fixing seat and two pushing portions for pressing the respective movable positioning bodies for lateral displacement in each through-hole, and an elastic member placed between the protruding shaft portion of the fixing seat and the rotating shaft of the driving member.

8 Claims, 9 Drawing Sheets

(56) References Cited

U.S. PATENT DOCUMENTS

| | | | | |
|---|---|---|---|---|
| 9,091,293 | B1 * | 7/2015 | Tseng | F16B 21/12 |
| 9,151,343 | B2 * | 10/2015 | Norton | B25J 17/0233 |
| 10,132,345 | B2 * | 11/2018 | Wu | F16B 21/02 |
| 10,294,971 | B2 * | 5/2019 | Wu | F16B 5/0635 |
| 11,098,839 | B2 * | 8/2021 | Wang | F16B 37/042 |
| 11,150,540 | B2 * | 10/2021 | Zhu | F16M 11/16 |
| 12,234,849 | B2 * | 2/2025 | Wu | F16B 2/04 |
| 2015/0300398 | A1 * | 10/2015 | Tseng | F16B 5/0208 411/91 |
| 2023/0110234 | A1 * | 4/2023 | Wu | F16B 21/02 403/322.2 |
| 2025/0243887 | A1 * | 7/2025 | Tseng | F16B 19/02 |

* cited by examiner

ROTARY POSITIONING DEVICE

CROSS REFERENCE TO THE RELATED APPLICATIONS

This application is a Continuation-In-Part of application Ser. No. 17/510,777, filed on Oct. 26, 2021, for which priority is claimed under 35 U.S.C. § 120, the entire contents of which are hereby incorporated by reference.

BACKGROUND OF THE INVENTION

1. Field of the Invention

The present invention relates to fasteners more particularly, to a rotary positioning device for locking or unlocking by means of rotation and pressing, wherein a fixing seat and a rotation unit are assembled above a base for the rotation unit to rotate and press on the fixing seat to drive two movable positioning bodies on a stopper of the base to form a block or retreat, achieving the purpose of conveniently driving the positioning device for locking or automatic reset and unlocking.

2. Description of the Related Art

General boards (board-to-board) are locked by positioning screws with knobs, collars and screws when they are assembled and joined. It is to fix the screw and the collar on the outer panel first, then turn the knob to lock the screw into the inner panel to form a preset position, and then use a hand tool to lock the screw, so that the outer panel and the inner panel are locked into one. This kind of locking mode of multi-layer boards is used for boards that can be used in machine took or other board-to-board connections. However, these working machines need to use plates for locking joints, most of which are power devices or speed adjustment devices. All kinds of power devices and speed adjustment devices are located inside the space formed by the tool shell, which can be assembled, locked and disassembled by plates. When the power device crashes or fails or is damaged, or the speed adjustment device changes or adjusts the speed, remove the plate for related maintenance and adjustment operations. The board is locked by multiple positioning screws, so it is easy to cause the positioning screws to fall off or be lost during the disassembly process, and the board cannot be re-locked back to its original position, which will affect the inconvenience and trouble of assembly and disassembly operations. That is to say, in order to solve the shortcoming that the locking screw is easy to be lost, some operators have developed a fixing device composed of a cap, a screw part and a positioning seat. First fasten the positioning seat of the fixing device into the perforation of the plate, and then use the screw part to lock it on another plate to form a fixation, and when the user removes the plate, the fixing device can still be fixed on the plate through the positioning seat in the perforation, so that the fixing device will not fall off or be lost. However, in the assembly process, it is still necessary to operate by the user or use hand tools (such as a screwdriver or wrench, etc.) to control the locking or dismounting of the fixing device, and there are still many deficiencies and problems in practical applications.

Furthermore, the combination of two opposite panels by locking and fixing, under the requirements of modularized mass production and processing efficiency today, makes the use of screws to carry out cumbersome manual assembly procedures, which will seriously affect the manufacturer's delivery schedule. Due to the small size of the screw, it is easy to lose during the process of locking the second plate. And it will cause difficulties in assembly, alignment or locking due to the difference in the size of the screw hole at the screw locking position or the inconsistency in the number of teeth and pitch of the screw hole. In addition, the space between the two opposite plates for operating the screws is quite narrow, that is, when the screws are assembled and disassembled, they are easily blocked by surrounding objects, which not only consumes man-hours and inconvenience, but it will also lead to an increase in the overall cost and increase the burden on the industry.

At present, the chassis or servers of various electronic devices will be assembled with multiple removable hard drives (such as SSD or HDD, etc.). Usually, all kinds of hard drives are pushed into the case or server by push-type sliding to form an electrical connection for storing or reading data. However, after the hard disk is pushed into the case or server, it is only connected to each other through the electrical connector, which will make it difficult to align and assemble due to misalignment and tolerance. And there is no other positioning device or fixing mechanism, etc. which cannot form a guiding alignment function, which may easily lead to loosening or separation between the hard disk and the chassis or server. Especially when the chassis or server is shaken by external force, it is easy to cause the hard disk to fall off or separate from the chassis or server, and it is easy to cause a momentary disconnection between the hard disk and the chassis or server, thereby affecting the electrical connection between the hard disk and the chassis or server, etc., and shortening the service life.

Therefore, how to solve the problems and troubles that the fixing device used in the current plate locking is easy to be loosened and disengaged by wrong rotation, and the fixing device needs to apply force or use hand tools when assembling, it is the direction that relevant manufacturers engaged in this industry are eager to study and improve.

Therefore, in view of the above-mentioned problems and deficiencies, the inventor collected relevant information, evaluated and considered in many ways, and based on years of experience accumulated in this industry, through continuous creation and modification, the invention patent of this kind of rotary positioning device was born.

SUMMARY OF THE INVENTION

The present invention has been accomplished under the circumstances in view. It is therefore the main object of the present invention to provide a rotary positioning device, which comprises a base, a fixing seat, a rotation unit and an elastic member. The base comprises a base body, a shaft extended outward from one side of the base body, and a stopper provided on one side of the shaft opposite to the base body. The fixing seat comprises an accommodating space inside to be assembled on the outside of the shaft and stopper of the base in a movable alignment, an opening provided on one side of the accommodating space and penetrating outwards, a protruding shaft portion and a clamping portion located outside the opening, two horizontal through-holes respectively located on two opposite sides of the accommodating space, and a movable positioning body respectively placed in each horizontal through-hole. The rotation unit is assembled outside the fixing seat. The rotation unit comprises a driving member assembled inside the opening of the protruding shaft portion, and a rotating member combined with the outside of the driving member. The driving member comprises a rotating shaft for movably installed at the opening inside the protruding shaft portion, and a connecting portion with enlarged outer diameter located on one side of the rotating shaft. The rotating member comprises a rotating space inside, a connecting portion provided on one side of the rotating space and penetrating outward and used for connecting and positioning the connecting portion on one side of the driving member, two inner shoulders respectively located on two opposite walls on one side of the rotating space that rotate and resist or retreat from the two sides of the clamping portion, and two pushing portions respectively provided adjacent to the inner shoulders to press the respective each movable positioning body for lateral displacement in each through-hole. The elastic member is placed between the protruding shaft portion of the fixing seat and the rotating shaft of the driving member for the rotating member of the rotation unit to squeeze the elastic member when rotating, so that the elastic recovery force of the elastic member can be used to drive the rotating member to quickly and automatically reset, so as to achieve the purpose of quickly rotating the rotation unit to lock in position or automatically reset and unlock.

It is another object of the present invention to provide a rotary positioning device, wherein the base further comprises a connecting portion provided at the bottom of the base body and used to be fixed at a first positioning hole of a preset first plate (welding, riveting or tight fit can be used to fix it), a cylinder with reduced diameter connected between the shaft and the stopper, and a concave ring groove formed on the outside of the cylinder between the shaft and the stopper.

It is still another object of the present invention to provide a rotary positioning device, wherein the fixing seat further comprises a docking portion on the other side relative to the protruding shaft portion to be fixed at a second positioning hole of a preset second plate (welding, riveting or tight fit can be used to fix it). The clamping portion of the fixing seat is in the shape of a rectangle adjacent to the protruding shaft portion and provided with a clamping hole. The elastic member comprises a longitudinal fixing rod extending vertically at one side thereof and fixed in the clamping hole, and a horizontal fixing rod extending horizontally and laterally at an opposite side thereof relative to the longitudinal fixing rod. The rotating member comprises a limiting groove for the horizontal fixing rod to be fixed inside the rotating space of the rotating member. The clamping portion is in the shape of a rectangle adjacent to the protruding shaft portion. The fixing seat further comprises two opposing limiting abutment surfaces located on both sides of the bottom of the clamping portion. In the rotating space of the rotating member of the rotating unit, inner shoulders are respectively provided on the inner sides, so that when the rotating member rotates, the inner shoulders are driven to hold or withdraw from each limiting abutment surface.

It is still another object of the present invention to provide a rotary positioning device, wherein the fixing seat is provided with the opening with a reduced aperture on one side of the accommodating space, and an inclined ring shoulder formed between the accommodating space and the opening. The driving member of the rotation unit is installed in the opening with the rotating shaft. The driving member comprises an outer cone ring with an enlarged outer diameter provided on one side of the rotating shaft to resist the inclined ring shoulder.

It is still another object of the present invention to provide a rotary positioning device, wherein the driving member of the rotation unit is provided with a fitting shaft with an enlarged outer diameter on one side of the rotating shaft. The connecting portion of the driving member is located on the other side of the fitting shaft relative to the rotating shaft and provided with a concavo-convex connecting surface on an outer ring surface thereof. The connecting portion and concavo-convex connecting surface of the driving member are integrally molded with the rotating member by insert molding, so that the connecting portion of the rotating member is fastened and positioned at the connecting portion and the concavo-convex connecting surface of the driving member. The rotating member comprises an indicating side protruded from one side thereof, so that the appearance of the rotating member forms a drop shape, and an anti-slip curved surface provided on an outer ring surface thereof. The anti-slip curved surface can be a corrugated, zigzag, reticulated, or regular or irregular curved surface, or any kind of uneven surfaces.

DETAILED DESCRIPTION OF THE PREFERRED EMBODIMENT

Figure 1:
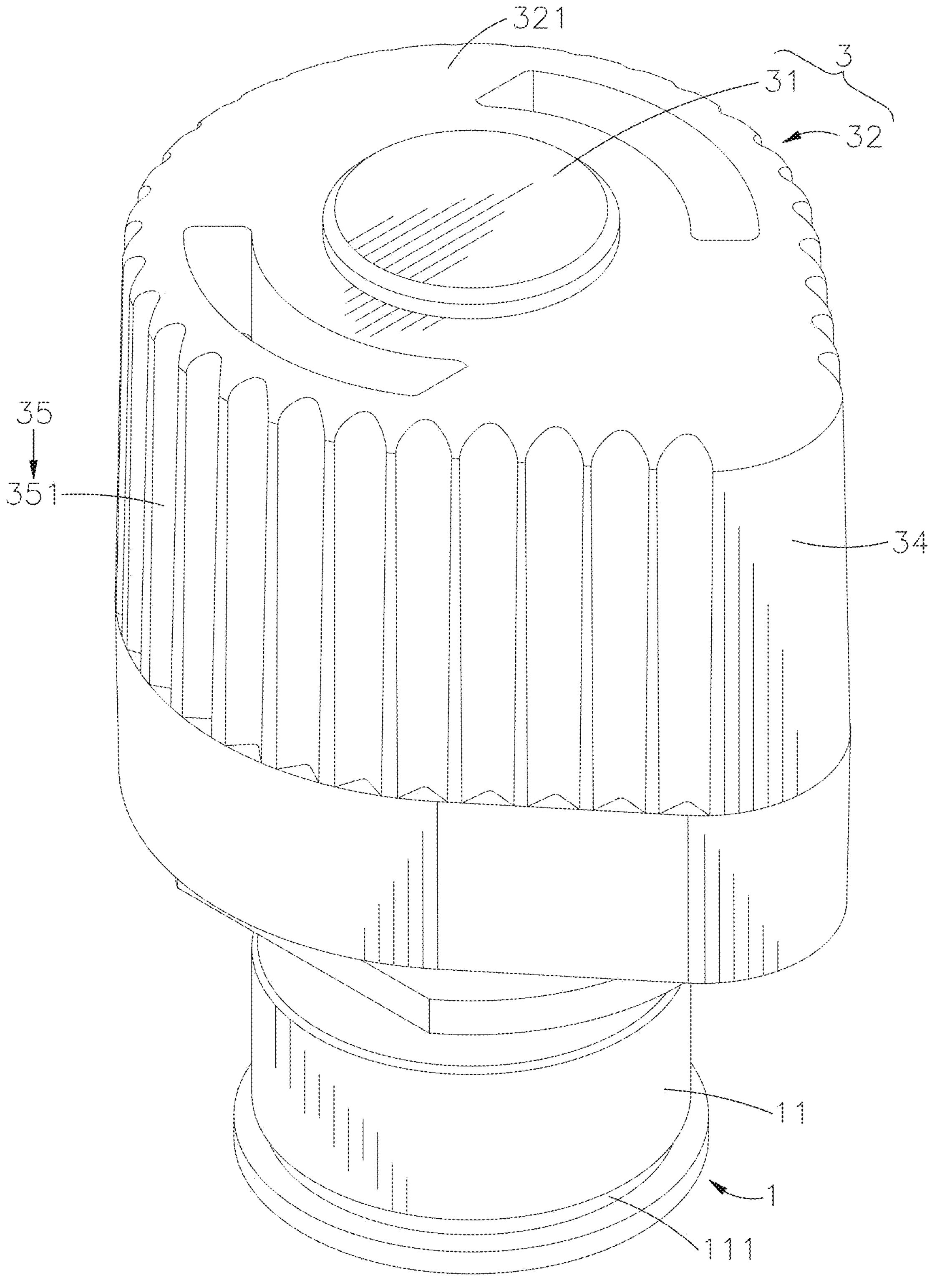
FIG. 1 is an oblique top elevational view of a rotary positioning device in accordance with the present invention.
Figure 2:
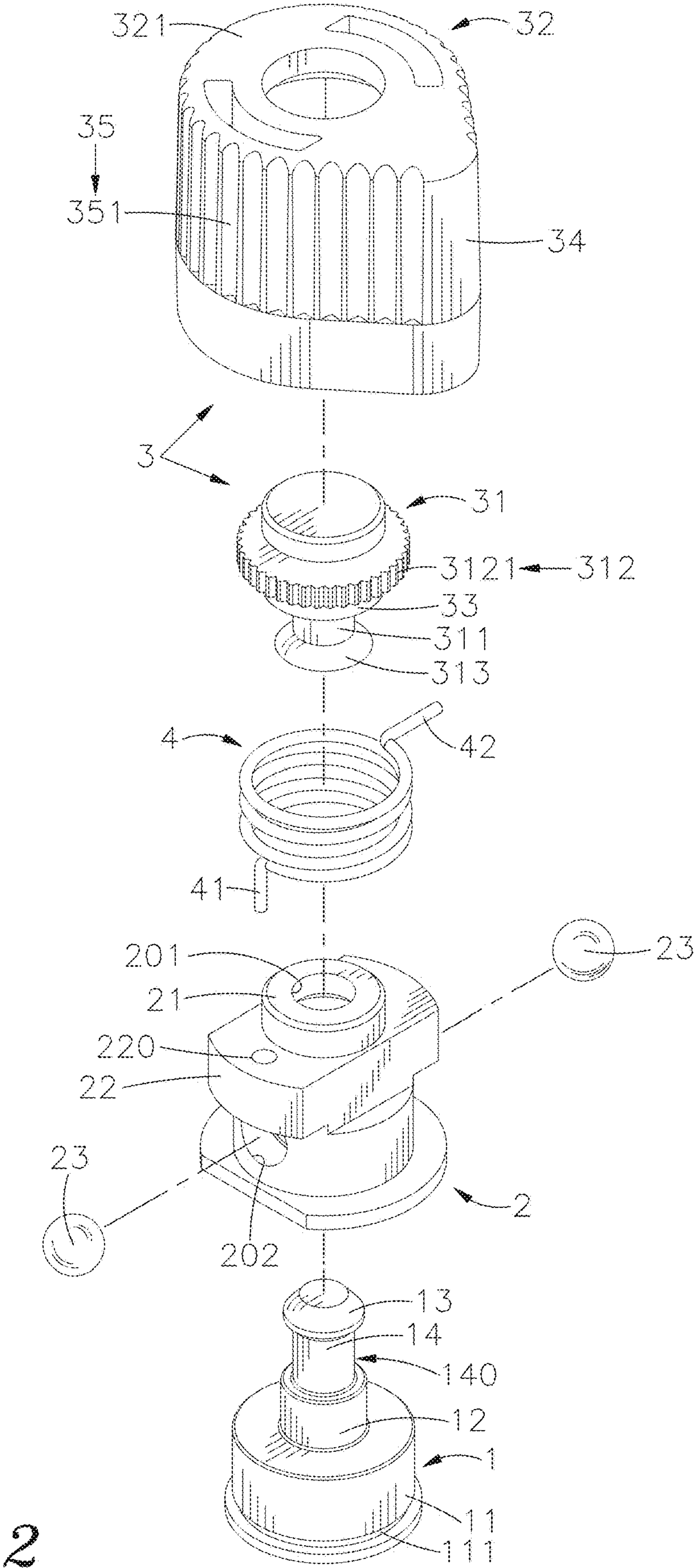
FIG. 2 is an exploded view of the rotary positioning device in accordance with the present invention.
Figure 3:
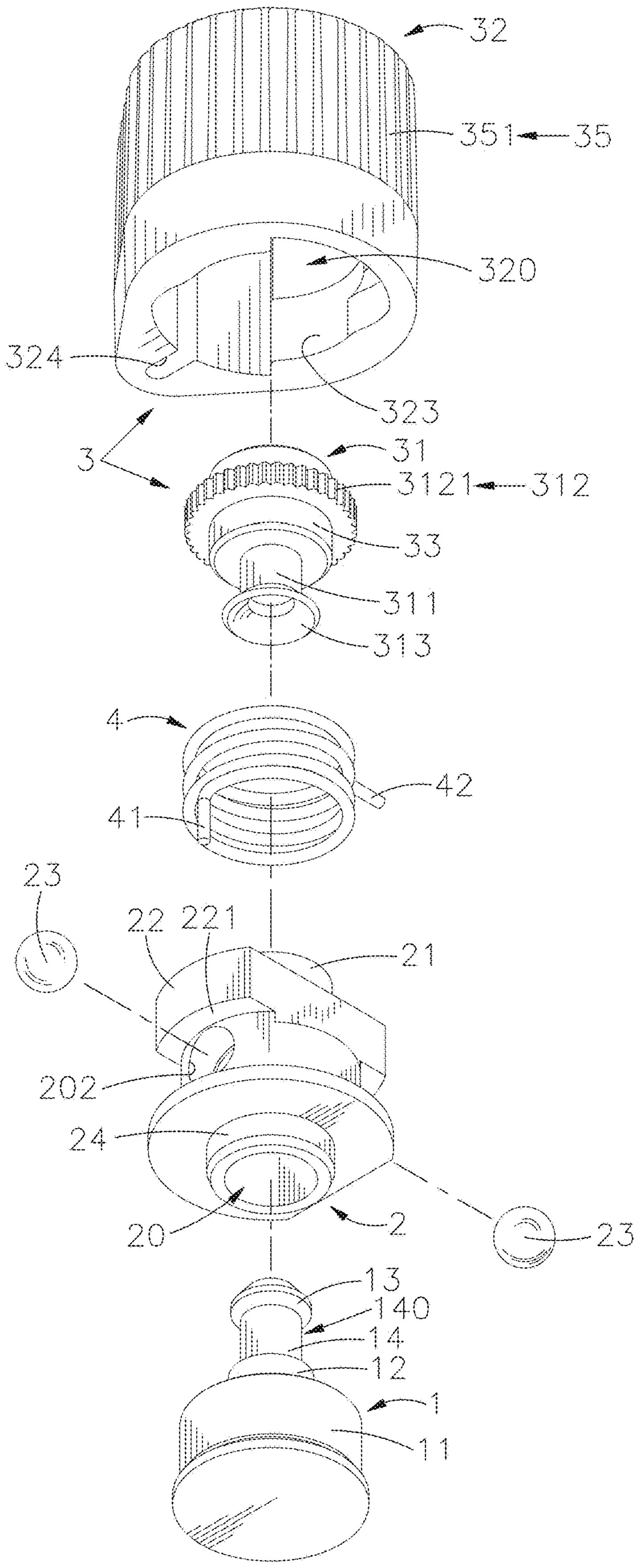
FIG. 3 corresponds to FIG. 2 when viewed from another angle.
Figure 4:
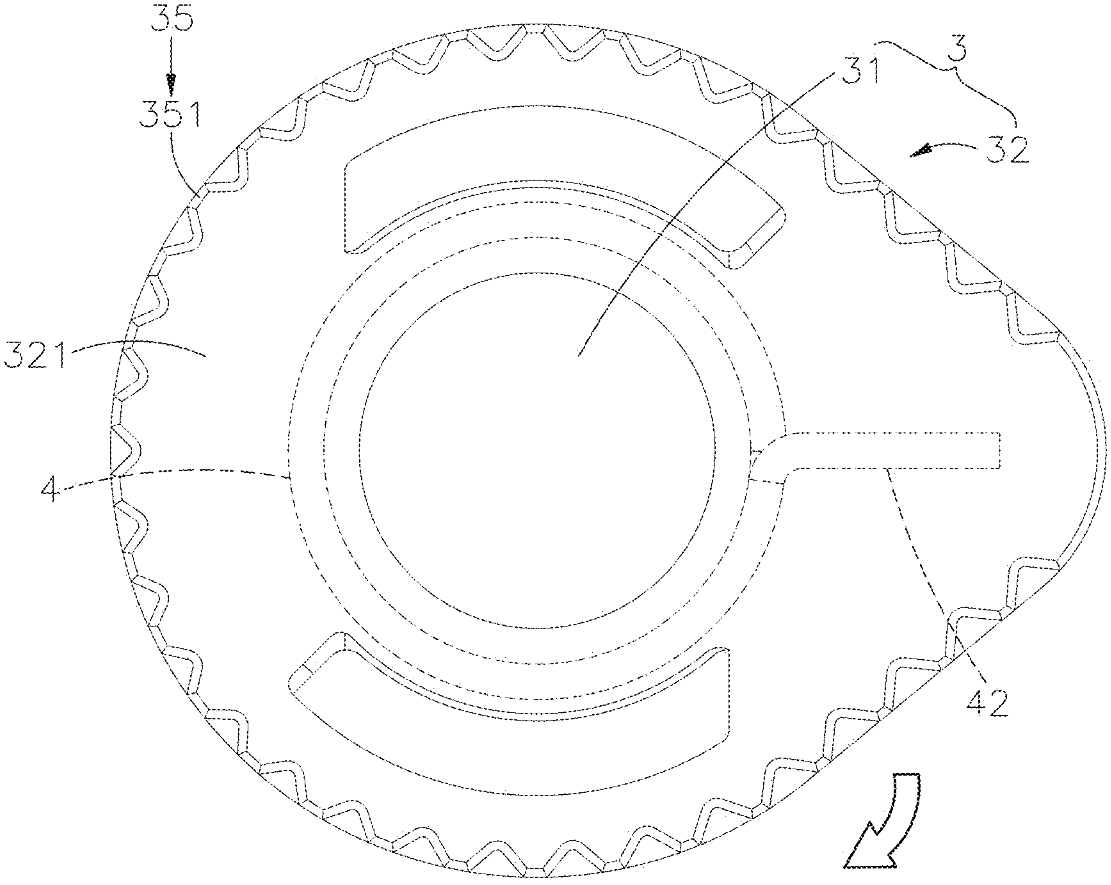
FIG. 4 is a top view of the rotary positioning device in accordance with the present invention.
Figure 5:
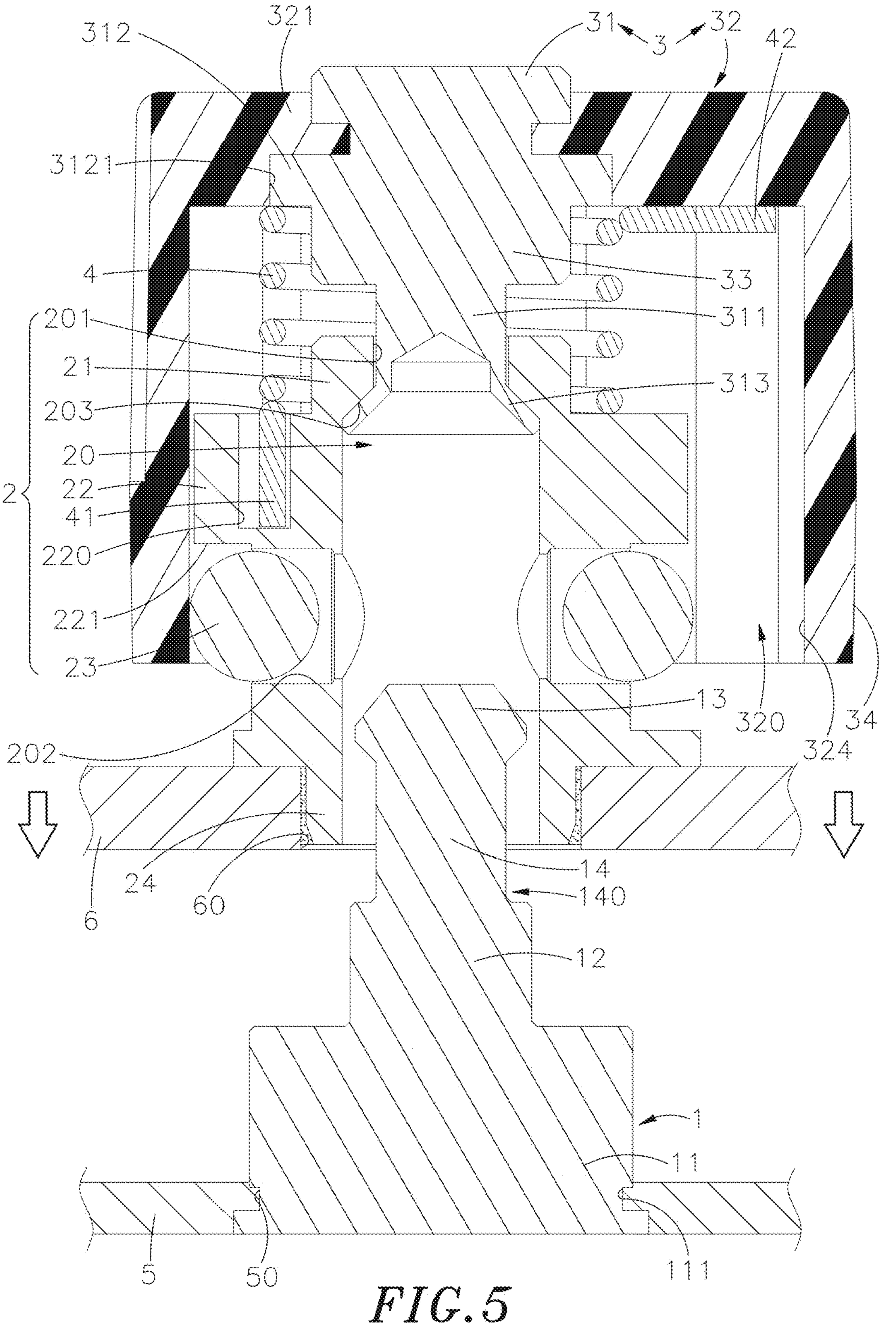
FIG. 5 is a side sectional view of the fixing seat and base of the present invention before assembly.

Please refer to FIGS. 1, 2, 3, 4, and 5. It can be clearly seen from the figures that the rotary positioning device of the present invention comprises a base 1, a fixing seat 2, a rotation unit 3 and an elastic member 4.

The base 1 comprises a base body 11, a shaft 12 and a stopper 13. The shaft 12 is extended outward from one side of the base body 11, and the stopper 13 is provided on the side of the shaft 12 opposite to the base body 11.

The fixing seat 2 comprises an accommodating space 20 inside, which can be assembled on the outside of the shaft 12 and stopper 13 of the base 1 in a movable alignment, an opening 201 provided on one side of the accommodating space 20 and penetrating outwards, an adjacent protruding shaft portion 21 and a clamping portion 22 in the shape of a rectangle located outside the opening 201, a clamping hole 220 located on one side surface of the clamping portion 22, two opposing limiting abutment surfaces 221 located on the other side of the clamping portion 22, two horizontal through-holes 202 respectively located on two opposite sides of the accommodating space 20, and a movable positioning body 23 respectively placed in each horizontal through-hole 202.

The rotation unit 3 is assembled outside the fixing seat 2, comprising a driving member 31 and a rotating member 32 combined with the outside of the driving member 31. The driving member 31 comprises a rotating shaft 311, which can be used for movably installed at the opening 201 inside the protruding shaft portion 21, and a connecting portion 312 with enlarged outer diameter located on one side of the rotating shaft 311. The rotating member 32 comprises a rotating space 320 inside, a connecting portion 321 provided on one side of the rotating space 320 and penetrating outward and used for connecting and positioning the connecting portion 312 on one side of the driving member 31, and an inner shoulder 322 and a pushing portion 323 respectively provided on each of two opposite walls on one side of the rotating space 320 adjacent, to each other. When the rotating member 32 rotates, it drives the inner shoulders 322 to resist or withdraw from the limiting abutment surfaces 221 of the clamping portion 22, and drives the pushing portions 323 to respectively press each movable positioning body 23 in each through-hole 202 to move in and out laterally.

The elastic member 4 is placed between protruding shaft portion 21 of the fixing seat 2 and the rotating shaft 311 of the driving member 31.

The above-mentioned base 1 is provided with a connecting portion 111 at the bottom of the base body 11, which can be fixed at the first positioning hole 50 of the preset first plate 5 (by means of welding, riveting or tight fit, etc.). The base 1 further comprises a cylinder 14 with reduced diameter connected between the shaft 12 and the stopper 13, and a concave ring groove 140 formed on the outside of the cylinder 14 between the shaft 12 and the stopper 13.

Furthermore, the above-mentioned fixing seat 2 further comprises a docking portion 24 on the other side relative to the protruding shaft portion 21, which can be fixed at the second positioning hole 60 of the preset second plate 6 (welding, riveting or tight fit can be used). The rectangular clamping portion 22 is provided on the adjacent side of the protruding shaft portion 21, and the clamping hole 220 is provided on the clamping portion 22. On one side of the elastic member 4, a longitudinal fixing rod 41 extending vertically is fixed in the clamping hole 220, and a horizontal fixing rod 42 extending horizontally and laterally is provided on the other side of the elastic member 4 relative to the longitudinal fixing rod 41. A limiting groove 324 is provided inside the rotating space 320 of the rotating member 32, which can be used for the horizontal fixing rod 42 to be inserted into a fixed position along the limiting groove 324. In addition, the fixing seat 2 is provided with the limiting abutment surfaces 221 on both sides of the bottom of the rectangular clamping portion 22, and the rotating member 32 of the rotation unit 3 is provided with the inner shoulders 322 on the inner side of the rotating space 320. When the rotating member 32 rotates, each inner shoulder 322 is driven to hold or withdraw from each limiting abutment surface 221 respectively.

In addition, the above-mentioned fixing seat 2 is provided with the opening 201 with a reduced aperture on one side of the internal accommodating space 20, and an inclined ring shoulder 203 is formed between the accommodating space 20 and the opening 201. The driving member 31 of the rotation unit 3 is installed in the opening 201 with the rotating shaft 311. An outer cone ring 313 with an enlarged outer diameter is provided on one side of the rotating shaft 311 to resist the inclined ring shoulder 203.

Furthermore, the above-mentioned driving member 31 of the rotation unit 3 is provided with a fitting shaft 33 with an enlarged outer diameter on one side of the rotating shaft 311 The connecting portion 312 is provided on the other side of the fitting shaft 33 relative to the rotating shaft 311. The outer diameter of the connecting portion 312 is larger than the outer diameter of the fitting shaft 33. The connecting portion 312 has a concavo-convex connecting surface 3121 on the outer ring surface. The connecting portion 312 and the concavo-convex connecting surface 3121 can be integrated with the rotating member 32 by insert molding, so that the connecting portion 321 of the rotating member 32 is fastened and combined to be positioned at the connecting portion 312 and the concavo-convex connecting surface 3121. In addition, an indicating side 34 is protruded from one side of the rotating member 32, so that the appearance of the rotating member 32 forms a drop shape and an anti-slip curved surface 351 is provided on the outer ring surface 35, and the anti-slip curved surface 351 can be a corrugated, zigzag, reticulated, or regular or irregular curved surface, or any kind of uneven surfaces it can smoothly grasp the anti-slip curved surface 351 to control the rotating member 32, and the rotation displacement is not easy to slip and loose. The pointing position of the indicating side 34 of the rotating member 32 can be used to identify whether the driving member 31 and the rotating member 32 of the rotation unit 3, the fixing seat 2 and the base 1 are docked and positioned or loose and separated.

Figure 6:
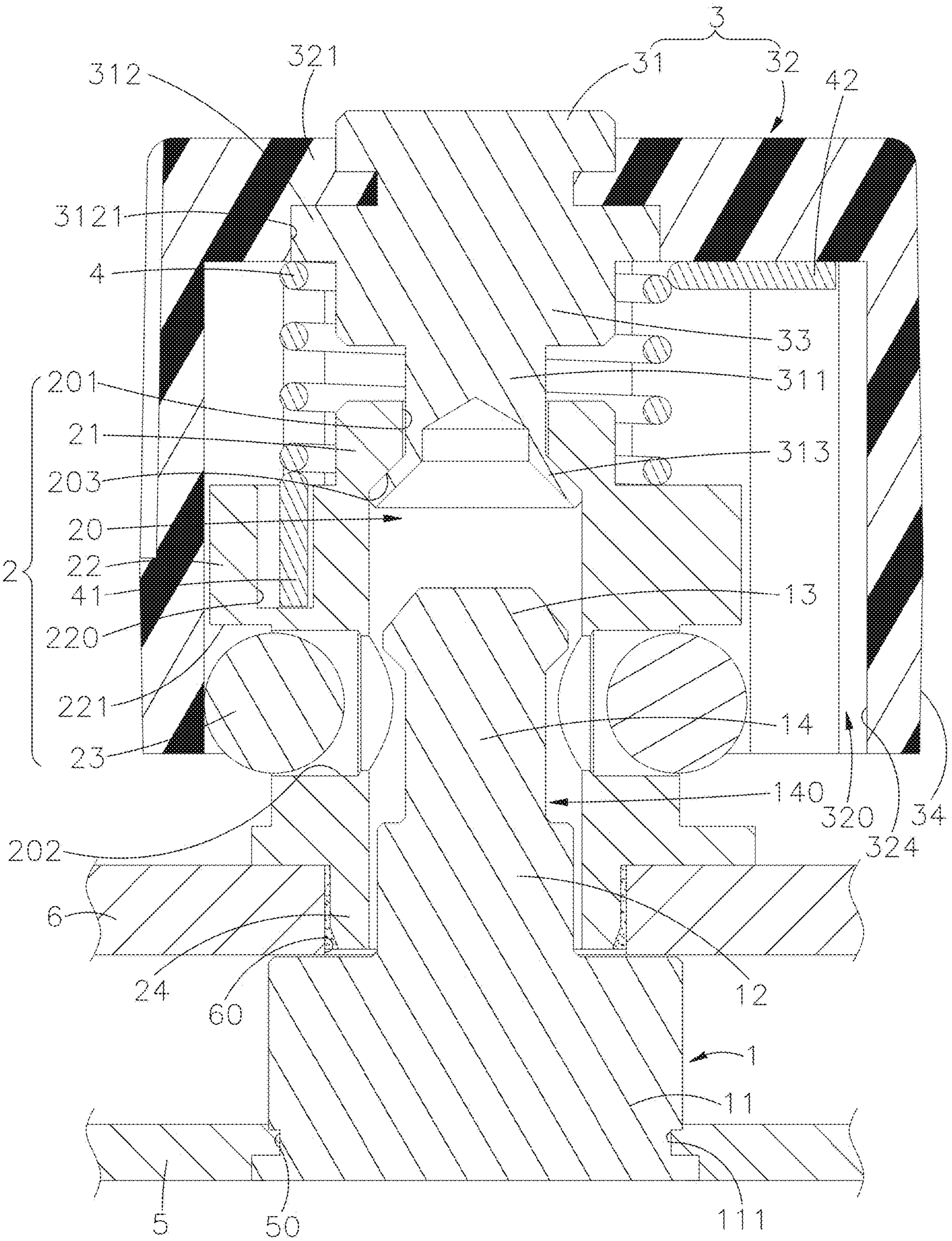
FIG. 6 is a side sectional view of the fixing seat and base of the present invention during assembly.
Figure 7:
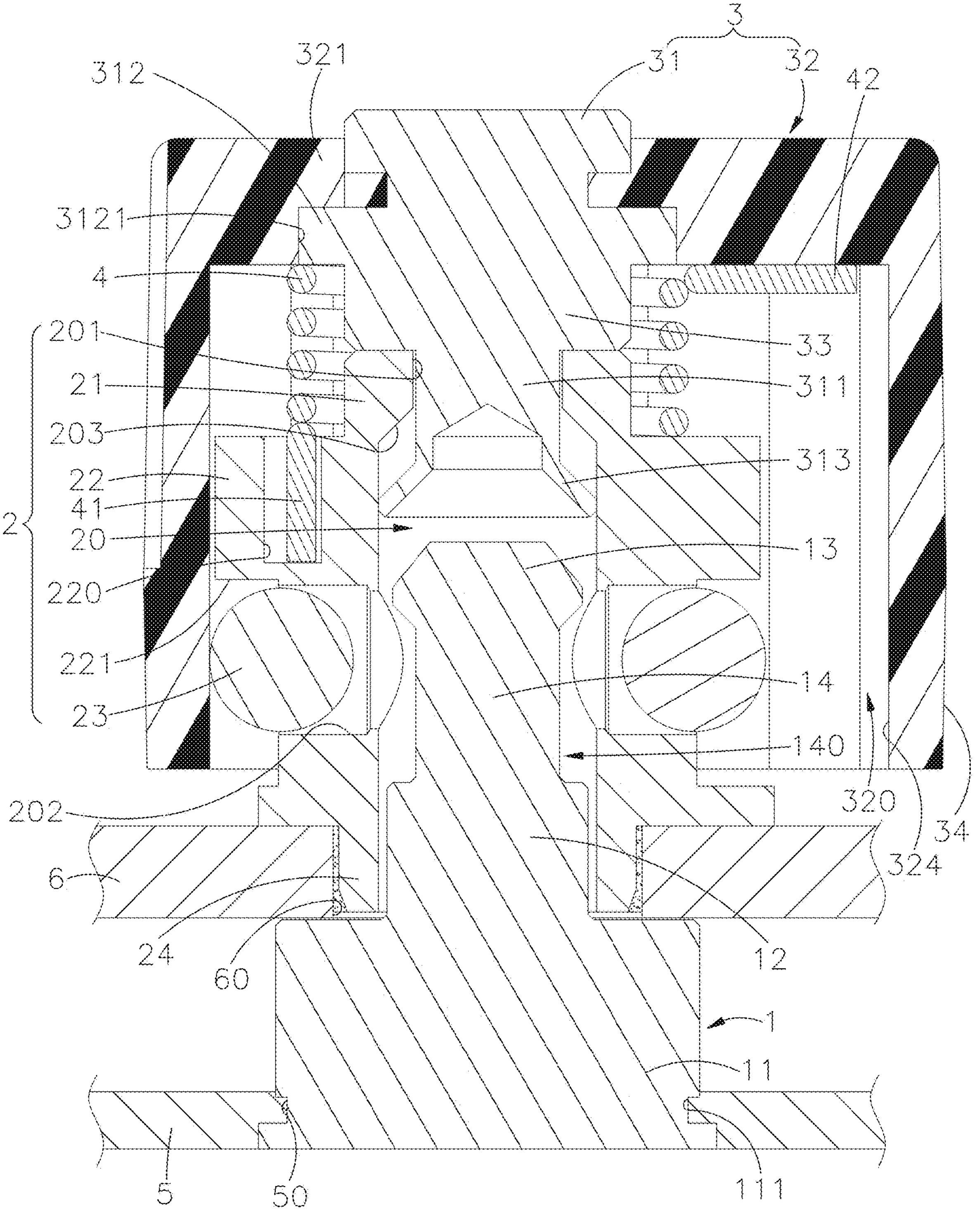
FIG. 7 is a side view sectional view of the fixing seat and base of the present invention before locking.
Figure 8:
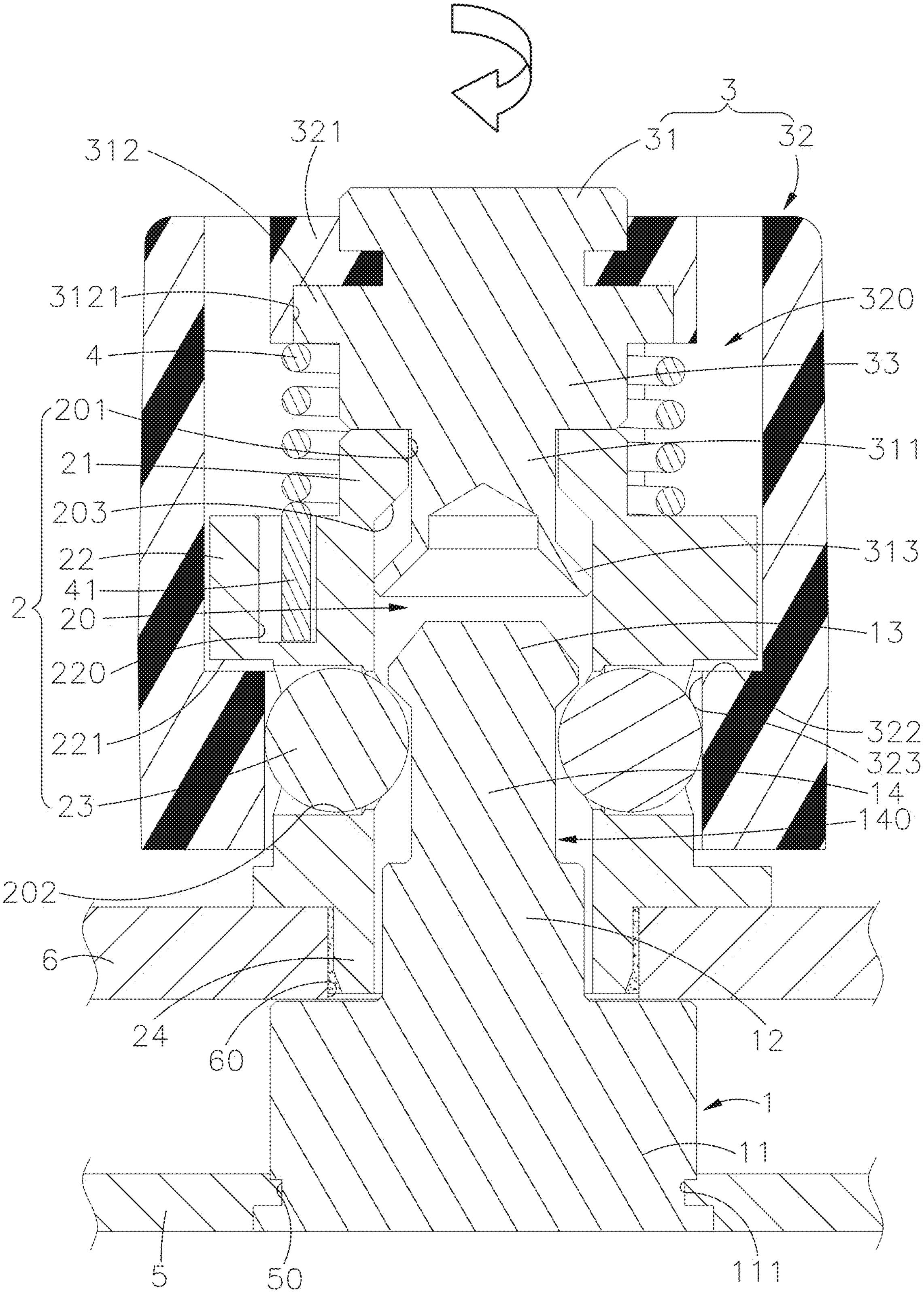
FIG. 8 is a side view sectional view of the fixing seat and base of the present invention after locking.
Figure 9:
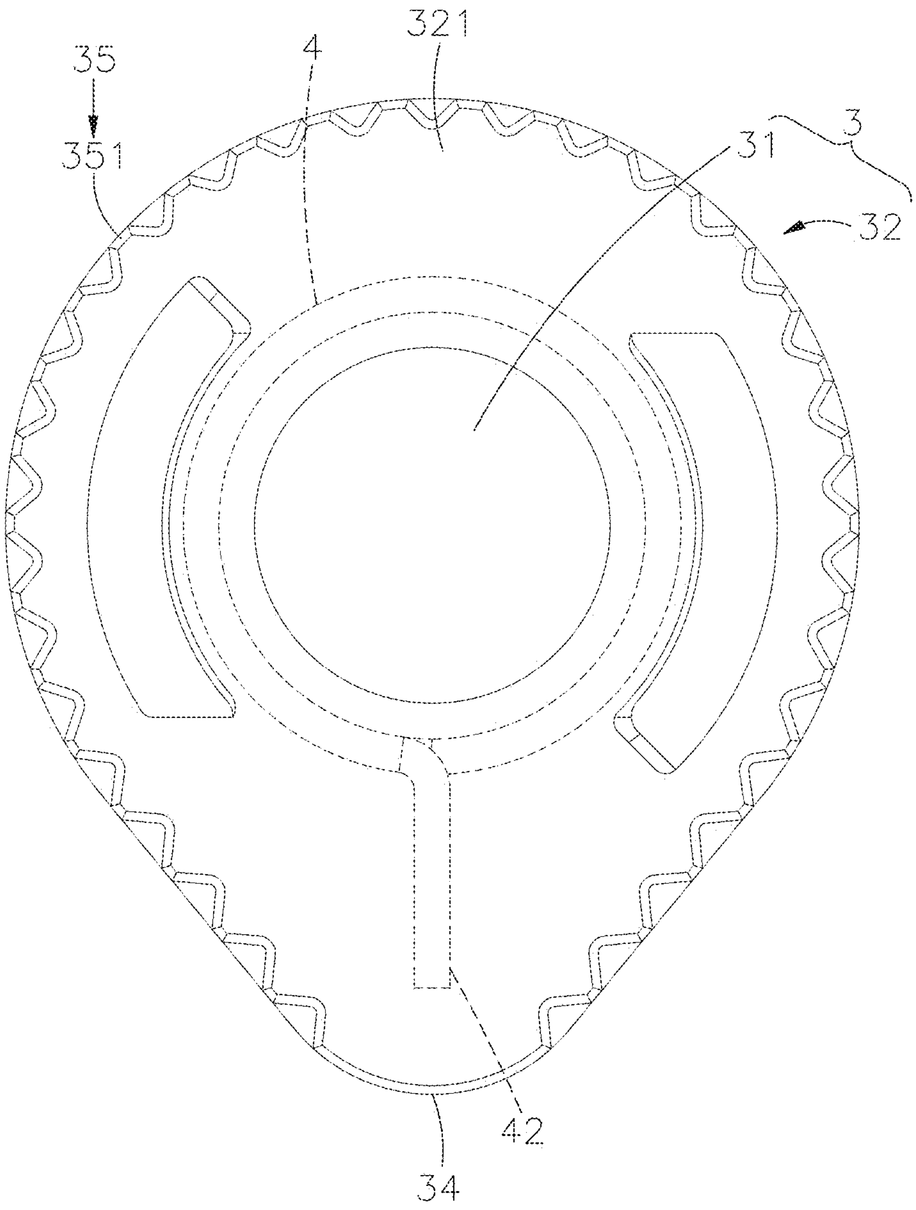
FIG. 9 is a top view of the present invention after locking.

Please refer to FIGS. 2, 3, 4, 5, 6, 7, 8, and 9 again. When the rotary positioning device of the present invention is implemented in practical applications, it uses the base 1 to be fixed on the preset first plate 5 (such as: server side panel or chassis panel of electronic device, etc.), and the fixing seat 2 is fixed behind the preset second plate 6 (such as: the shell of the removable disk or the shell of the interface card, etc.). By assembling the internal accommodating space 20 of the fixing seat 2 at the shaft 12, stopper 13 and cylinder 14 of the base 1, and then the driving member 31 and rotating member 32 of the rotating unit 3 assembled externally by the fixing seat 2 are operated to rotate (clockwise or counterclockwise) to drive the rotating shaft 311 of the driving member 31 to rotate (clockwise or counterclockwise) at the opening 201 of the fixing seat 2 while pressing down, so that the outer cone ring 313 on the side of the rotating shaft 311 leaves the inclined ring shoulder 203 of the accommodating space 20. The rotating member 32 also drives the elastic member 4 to rotate and squeeze between the protruding shaft portion 21 and the fitting shaft 33 at the same time, and the inner shoulders 322 on both sides of the rotating space 320 of the rotating member 32 are rotated respectively to the limiting abutment surfaces 221 on both sides of the clamping portion 22. At the same time, each pushing portion 323 on one side of each inner shoulder 322 pushes each movable positioning body 23 along the lateral displacement into each through-hole 202 to resist against the lower edge of the stopper 13 for the preset first plate 5 and the preset second plate 6 to form a docking positioning. Through the alignment and engagement of the base 1 and the fixing seat 2, it can form accurate alignment and fixation, and has the function of guiding alignment. The assembly and connection of the preset first plate 5 and the preset second plate 6 are less prone to misalignment or skewing, so that the preset first plate 5 and the preset second plate 6 can be connected and assembled stably. It is not easy to loosen and disengage, and the assembly operation is quite simple and fast.

To separate the preset first plate 5 and the preset second plate 6, rotate (counterclockwise or clockwise) and lift the rotating member 32 of the rotation unit 3 to drive the rotating shaft 311 of the driving member 31 to rotate and lift at the opening 201 of the fixing seat 2 (counterclockwise or clockwise), so that the outer cone ring 313 on one side of the rotating shaft 311 leans against the inclined ring shoulder 203 of the accommodating space 20. The rotating member 32 also links the elastic member 4 to rotate and release between the protruding shaft portion 21 and the fitting shaft 33. The rotating member 32 can be pushed to rotate and reset automatically by the elastic restoring force of the elastic member 4, and the inner shoulders 322 on both sides of the rotating space 320 of the rotating member 32 are respectively rotated and withdrawn from the limiting abutment surfaces 221 on both sides of the clamping portion 22. At the same time, each pushing portion 323 on one side of each inner shoulder 322 is separated from each movable positioning body 23, so that each movable positioning body 23 can move laterally to exit each through-hole 202 and retreat to the lower edge of the stopper 13 for quick release and separation of the preset first plate 5 and the preset second plate 6. The disassembly operation is quite convenient and fast.

The above is only a preferred embodiment of the present invention, and does not limit the patent scope of the present invention. Therefore, all simple modifications and equivalent structural changes made by using the contents of the description and drawings of the present invention should be included in the patent scope of the present invention in the same way.

In summary, the above-mentioned rotary positioning device of the present invention can indeed achieve its efficacy and purpose when used. Therefore, this invention is an invention with excellent practicability. In order to meet the requirements for patent application, I would like to file an application in accordance with the law. I hope that the review committee will approve this case as soon as possible to protect the hard work of the inventor. If the review committee has any doubts, please do not hesitate to send a letter to instruct, the inventor will try his best to cooperate, and really appreciate it.

What the invention claimed is:

1. A rotary positioning device, comprising a base, a fixing seat, a rotation unit and an elastic member, wherein:

said base comprises a base body, a shaft extended outward from one side of said base body, and a stopper provided on one side of said shaft opposite to said base body;

said fixing seat comprises an accommodating space inside to be assembled on an outside of said shaft and said stopper of said base in a movable alignment, an opening provided on one side of said accommodating space and penetrating outwards, an adjacent protruding shaft portion and a clamping portion located outside said opening, two horizontal through-holes respectively located on two opposite sides of said accommodating space, and a movable positioning body respectively placed in each said horizontal through-hole;

said rotation unit is assembled outside said fixing seat, said rotation unit comprising a driving member assembled inside said opening of said protruding shaft portion and a rotating member combined with an outside of said driving member, said driving member comprising a rotating shaft for being movably installed at said opening inside said protruding shaft portion and a connecting portion with enlarged outer diameter located on one side of said rotating shaft, said rotating member comprising a rotating space inside, a connecting portion provided on one side of said rotating space and penetrating outward and used for connecting and positioning said connecting portion on one side of said rotating shaft, two inner shoulders respectively located on two opposite walls on one side of said rotating space that rotate and resist or retreat from two sides of said clamping portion and two pushing portions respectively provided adjacent to said inner shoulders to press the respective each said movable positioning body for lateral displacement in each said horizontal through-hole;

said elastic member is placed between said clamping portion of said fixing seat and said connecting portion provided on one side of said rotating space.

2. The rotary positioning device as claimed in claim 1, wherein said base further comprises a connecting portion provided at a bottom of said base body and used to be fixed at a preset first plate.

3. The rotary positioning device as claimed in claim 1, wherein said base further comprises a cylinder with reduced diameter connected between said shaft and said stopper, and a concave ring groove formed on an outside of said cylinder between said shaft and said stopper.

4. The rotary positioning device as claimed in claim 1, wherein said fixing seat further comprises a docking portion on the other side relative to said protruding shaft portion to be fixed at a preset second plate; said clamping portion is in a shape of a rectangle adjacent to said protruding shaft portion and provided with a clamping hole; said elastic member comprises a longitudinal fixing rod extending vertically at one side thereof and fixed in said clamping hole, and a horizontal fixing rod extending horizontally and laterally at an opposite side thereof relative to said longitudinal fixing rod; said rotating member comprises a limiting groove for said horizontal fixing rod to be fixed inside said rotating space of said rotating member.

5. The rotary positioning device as claimed in claim 1, wherein said fixing seat is provided with said opening with a reduced aperture on one side of said accommodating space, and an inclined ring shoulder formed between said accommodating space and said opening; said driving member of said rotation unit is installed in said opening with said rotating shaft, comprising an outer cone ring with an enlarged outer diameter provided on one side of said rotating shaft to resist said inclined ring shoulder.

6. The rotary positioning device as claimed in claim 1, wherein said clamping portion is in a shape of a rectangle adjacent to said protruding shaft portion; said fixing seat further comprises two opposing limiting abutment surfaces located on both sides of a bottom of said clamping portion, said two inner shoulders respectively located on inner sides of said rotating space, when said rotating member rotates, each said inner shoulder is driven to hold or withdraw from each said limiting abutment surface and said two said pushing portions respectively provided adjacent to said inner shoulders to press the respective each said movable positioning body for the lateral displacement in each said horizontal through-hole.

7. The rotary positioning device as claimed in claim 1, wherein said driving member of said rotation unit is provided with a fitting shaft with an enlarged outer diameter on one side of said rotating shaft; said connecting portion of said driving member is located on the other side of said fitting shaft relative to said rotating shaft and provided with a concavo-convex connecting surface on an outer ring surface thereof, an outer diameter of said connecting portion is larger than an outer diameter of said fitting shaft; said connecting portion and said concavo-convex connecting surface of said driving member are integrally molded with said rotating member by insert molding, so that said connecting portion of said rotating member is fastened and positioned at said connecting portion and said concavo-convex connecting surface of said driving member.

8. The rotary positioning device as claimed in claim 1, wherein said rotating member comprises an indicating side, said indicating side is protruded from one side of said rotating member, so that an appearance of said rotating member forms a drop shape, and an anti-slip curved surface provided on an outer ring surface thereof, and said anti-slip curved surface being selectively to be a corrugated, zigzag, reticulated, regular or irregular curved surface, or any kind of uneven surfaces.

* * * * *